US010608880B2

(12) United States Patent
Kehrer et al.

(10) Patent No.: US 10,608,880 B2
(45) Date of Patent: Mar. 31, 2020

(54) VLAN PORT SIGNALING

(71) Applicant: Hirschmann Automation and Control GmbH, Neckartenzlingen (DE)

(72) Inventors: Stephan Kehrer, Dusslingen (DE); Zbigniew Pelzer, Neckartailfingen (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 0 days.

(21) Appl. No.: 15/571,268

(22) PCT Filed: Jun. 3, 2016

(86) PCT No.: PCT/EP2016/062678
§ 371 (c)(1),
(2) Date: Nov. 10, 2017

(87) PCT Pub. No.: WO2016/193445
PCT Pub. Date: Dec. 8, 2016

(65) Prior Publication Data
US 2018/0351805 A1 Dec. 6, 2018

(30) Foreign Application Priority Data

Jun. 3, 2015 (DE) ........................ 10 2015 210 306

(51) Int. Cl.
*H04L 12/24* (2006.01)
*H04L 12/46* (2006.01)
(52) U.S. Cl.
CPC ...... *H04L 41/0873* (2013.01); *H04L 41/0883* (2013.01); *H04L 41/20* (2013.01); *H04L 41/24* (2013.01); *H04L 12/4641* (2013.01)

(58) Field of Classification Search
CPC ..... H04L 41/20; H04L 41/24; H04L 41/0873; H04L 12/4641
USPC .......................................... 709/224
See application file for complete search history.

(56) References Cited

U.S. PATENT DOCUMENTS

| | | | |
|---|---|---|---|
| 6,330,307 B1 | 12/2001 | Bloch | |
| 8,891,915 B2 | 11/2014 | Wang | |
| 8,923,291 B2 | 12/2014 | Mitsumori | |
| 9,620,941 B2 | 4/2017 | Tucker | |
| 2005/0047334 A1* | 3/2005 | Paul | H04L 12/5601 370/229 |
| 2011/0113442 A1* | 5/2011 | Kikkawa | G09G 5/006 725/25 |
| 2013/0024563 A1* | 1/2013 | Torigoe | H04L 69/40 709/224 |
| 2013/0329344 A1* | 12/2013 | Tucker | H02B 15/00 361/633 |
| 2013/0336165 A1* | 12/2013 | Wakumoto | H04L 41/12 370/255 |
| 2017/0187648 A1 | 6/2017 | Kehrer | |

* cited by examiner

*Primary Examiner* — Minh Chau Nguyen
(74) *Attorney, Agent, or Firm* — Andrew Wilford

(57) ABSTRACT

The invention relates to a method for operating a network, wherein the network comprises a plurality of network devices having ports, the network devices being connected to one another for transmitting data via cables which are each inserted into a respective port, wherein each port has signaling means which can be switched between at least two signaling states. The invention is characterized in that all signaling means of those ports of the network devices, which have the same configuration, are brought into an associated detectable signaling state.

5 Claims, No Drawings

VLAN PORT SIGNALING

CROSS REFERENCE TO RELATED APPLICATIONS

This application is the US-national stage of PCT application PCT/EP2016/062678 filed and claiming the priority of German patent application 102015210306.4 itself filed 3 Jun. 2015.

The invention relates to a method of operating a network where a plurality of network devices have and are connected to one another to transmit data via cables each inserted into a respective one of the ports, and where each port has a signaling means that can be switched between at least two signaling states, according to the features of the preamble of claim 1.

Signaling from port interfaces to switches is known from DE 10 2015 206 379 [US 2017/0187648], in which a signaling means of a port of one network infrastructure device and a signaling means of a port of another network infrastructure device are brought into a signaling state that can be identified as belonging together. This makes it possible to render a user to identify ports to be interconnected via a cable.

It is the object of the invention to provide a method of improving the operation of a network in terms of user-friendliness.

This object is achieved by the features of patent claim 1.

According to the invention, all signaling means of the ports of the network devices having the same configuration are brought into a signaling state that can be identified as belonging together.

This offers the advantage that all of the ports of the network devices that have the same configuration are immediately identifiable for a user. This is advantageous not only at initial startup but also in the event that changes are made to existing network configurations, since one can determine right away which ports have the same configuration (and/or the same parameters), so that the network can be configured or cabled or used appropriately.

A network device such as a switch, for example, can have a single port but generally has a plurality of ports. For example, in a group of network devices that have only a single port, one can determine immediately which network has the same configuration and/or the same configured parameters with its port. In general, the network devices have several ports that are arranged next to or over one another, with it being conceivable for all of the ports to be configured differently or configured the same or differently from one another in groups or for all of the ports to be configured the same. This makes it especially difficult to locate equally configured ports, so that it is advantageous to be able to identify several of the ports of a network device that are configured the same by the respective signaling means and thus to distinguish them from the other, differently configured ports whose signaling means then signal a different configuration.

The signaling means can be controlled either by management software with access to the network and/or by a network management station that is integrated into the network, provided that the configuration to be indicated is selected beforehand in the network management software and/or at the network management station and set for signaling. This means that a user can use the network management software and/or the network management station to make queries regarding the configuration of the individual network devices or the configuration of the individual ports of the network devices arranged on the network and to identify which ports have the same configuration. These can then be selected by the user, and, as a result of this selection, the signaling means of the ports having the same configuration are controlled such that they are brought into a signaling state that is different from the signaling state of the other ports that differ from this identified and established configuration.

The solution is based on the idea of addressing all of the ports of the network devices of a network that have the same configuration and putting their signaling means, for example light-emitting diodes, into a signaling state from which one can determine that these ports are identically configured. One noteworthy possibility is for the signaling state to be a continuous illumination of the light-emitting diodes or blinking at a certain frequency.

In devices having a graphic display, for example, it would also be conceivable for the corresponding ports to be shown directly and graphically on that display. Therefore, a signaling means need not be a single signaling means (such as a light-emitting diode, for example), but rather it could also be more complex in nature (such as the abovementioned display, monitor, or the like).

It is important and advantageous in this regard for the signaling means of the respective ports of the network devices to not only be brought into a signaling state that can be identified as belonging together, but for a difference from the signaling state of the other signaling means of the ports of the respectively associated network device or all other network devices (for example if several network devices are grouped together in a patch panel) to also be identifiable. Take the example of several network devices such as switches that are grouped together in the customary manner on a rack or patch panel over and/or next to one another. These individual switches have a series of ports (for example that lie next to one another or are also arranged over one another), and a signaling means, such as a light-emitting diode, is generally associated with each port. During normal operation, when such a patch panel is cabled and started up, a plurality of light-emitting diodes blink in a confusing jumble. In this case, it is important that the ports to be signaled having the same configuration by the signaling means be brought into such a signaling state that not only enables the ports with the same configuration to be identified as belonging together, but also clearly differentiates itself from the other signaling states of the other ports of the network devices. One possibility that can be considered in this regard is that, for normal operation during data transmission, the signaling means of the ports of the network devices blink in the usual manner in dependence on the data transmission and the ports to be rendered identifiable are made identifiable by the fact that their signaling means shine continuously, blink at a different frequency, or are switched to another color, for example.

In a development of the invention, the signaling means of the ports that belong together shine continuously at the same time, are the same color, or blink synchronously with one another, whereas the other ports of the network devices blink, are a different color, or blink at a different frequency.

In a development of the invention, in order to differentiate the ports, the signaling means of the ports that belong together shine continuously at the same time and the other signaling means of the ports of the network devices, particularly all of the network devices of the network, are switched off or have a different brightness than those of the shining ports. This way also ensures that the ports to be identified as belonging together differ clearly from the ports of the network devices, preferably of all of the network devices of the network or of the patch panel.

Alternatively or in addition, according to the invention the signaling means of the ports that belong together blink synchronously with one another and the other signaling means of the ports of the network devices, particularly of all of the network devices of the network, blink in a phase-shifted manner, are switched off, or have a different brightness than those of the shining ports. This also enables a clear differentiation to be achieved between the signaling means of the ports that are signaling normal data transmission and the ports with the same configuration.

In a development of the invention, it is especially advantageous if the signaling means of the ports that belong together are in the same color, whereas the other ports are a different color. This can be achieved in an especially simple manner through the use of two-colored (or also multicolored) signaling means, such as two- or multicolored light-emitting diodes, for example. Thus, during normal operation of the data transmission, it is conceivable for all of the signaling means of the ports of the network devices to shine, for example in dependence on the transmitted data, whereas the ports with the same configuration blink at the same regular or irregular frequency but in another color. In this way, one can determine very quickly on the basis of the color difference which ports belong together.

In the following, the idea is described once again in other words and explained in further detail using various examples.

IS State/Problem:

At the moment, it is sometimes difficult in cases of complex configurations to verify whether one has already correctly configured everything on all switches at all of the ports of a switch. For example, whether one has already produced a VLAN=5 at all of the switches in question and whether all of the planned ports at all of the switches have been incorporated into this VLAN. This also applies, of course, to other "per bridge" or "per port" parameters, such as multiple spanning tree instances, GVRP protocols, Profinet, etc. The completeness of a configuration is not always simple to identify.

Idea with Solution Protocol:

A new function, "feature LED signaling" or "parameter LED signaling," is proposed that, with the aid of LED blinking (device LEDs and/or port LEDs), would signal whether a certain characteristic (or parameter) has already been configured in a certain manner on this device or only at this port.

EXAMPLE

A click on VLAN5, for example, in a web interface or in network management software (for example HiDiscovery), leads to a context menu in which "Signaling" can be selected and thus activated. In this case, that would mean that all of the ports of the given switch that belong to VLAN5 should begin blinking (at this time, other blinking processes, such as that of RSTP, should also be suspended). Moreover, this "VLAN5 signaling" command could also be forwarded to other switches (for example by LLDP), so that all of the ports on all switches would eventually blink that were already integrated into VLAN5, i.e. that have the same configuration. Precisely in this way, one could issue the command, for example, that all of the ports of a network device (particularly of a switch) are to blink that belong to a certain MSTP instance, or that those ports are to blink in which a certain source MAC address was learned, etc. Or the ports that are contained in a ring network (HiPER ring, for example) could be made to blink, or a switch that is a root bridge in RSTP (this time, all ports of the switch).

Another possible manner of implementing this idea might be possible, and it would make a provision (except on the switches that are physically present) to have the ports in question blink on the graphic topology rendering (however, the ports in question could also be provided with an additional text "VLAN5"). Such a mechanism would be much easier to implement in appropriate software due to the fact that one has access to all of the MIBs of all devices. For this purpose, a port blink command could be implemented (or point blink MIB) that could be sent to the desired switch.

Advantages of the Idea:

Such a feature signaling function can substantially facilitate certain elaborate network configurations by making it easier to check for the completeness of a configuration. For the same reason, troubleshooting can also be facilitated, for example because one can quickly see whether one too many (or too few) ports have been included in a VLAN=X.

LLDP: Link Layer Discovery Protocol
RSTP: Rapid Spanning Tree Protocol
VLAN: Virtual Local Area Network
MIB: Management Information Base
MAC: Media Access Control
GVRP: GARP VLAN Registration Protocol
GARP: Generic Attribute Registration Protocols
LED: Light Emitting Diode

The invention claimed is:

1. A method of operating a network in which
devices each having several ports are interconnected to one another via cables each connected to a respective one of the ports for data transmission,
each port has a signaling means that can be switched between at least two signaling states, and
a plurality of the ports have the same configuration, the method comprising the steps of:
bringing all the signaling means of those ports of the network devices that have the same configuration into a signaling state that can be identified as belonging together; and
controlling the signaling means via network management software that has access to or is integrated into the network after a configuration to be indicated has been selected beforehand in the network management software and set for signaling.

2. The method defined in claim 1, further comprising the step of:
making the signaling means of the ports that belong together shine continuously at the same time or with the same color, or blinking synchronously with one another.

3. The method defined in claim 1, further comprising the step of:
making the signaling means of the ports that belong together shine continuously at the same time, and
switching off the other signaling means of the ports of the other network devices or imparting to the other signaling means of the other ports of the other network devices a different brightness than those of the shining ports.

4. The method defined in claim 1, further comprising the step of:
making the signaling means of the ports that belong together blink synchronously with one another and either making the other signaling means of the ports of the other network devices blink in a phase-shifted manner, switching off the other signaling means of the ports of the other networks, or imparting a different brightness than those of the shining ports to the other signaling means of the ports of the other networks.

5. The method defined in claim 1, further comprising the step of:
imparting the same color to the signaling means of the ports that belong together.

\* \* \* \* \*